(12) United States Patent
Hawkins et al.

(10) Patent No.: US 9,327,707 B2
(45) Date of Patent: May 3, 2016

(54) METHOD AND APPARATUS FOR CONTROLLING A POWERTRAIN SYSTEM DURING COASTING

(71) Applicant: GM GLOBAL TECHNOLOGY OPERATIONS LLC, Detroit, MI (US)

(72) Inventors: Shawn Scott Hawkins, Shelby Township, MI (US); Shawn H. Swales, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 14/205,111

(22) Filed: Mar. 11, 2014

(65) Prior Publication Data
US 2015/0258973 A1 Sep. 17, 2015

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 10/06* | (2006.01) |
| *B60W 10/08* | (2006.01) |
| *B60W 20/00* | (2016.01) |
| *B60W 30/18* | (2012.01) |

(52) U.S. Cl.
CPC ............ *B60W 10/06* (2013.01); *B60W 10/08* (2013.01); *B60W 20/10* (2013.01); *B60W 30/18072* (2013.01); *B60W 2710/06* (2013.01); *B60W 2710/08* (2013.01); *B60W 2720/10* (2013.01); *Y10S 903/902* (2013.01)

(58) Field of Classification Search
CPC ..... B60W 20/00; B60W 10/08; B60W 10/06; Y02T 10/6286; B60K 6/445
USPC ............... 701/22, 53, 54, 70, 79, 84, 86, 101, 701/104, 110, 111, 112; 180/65.1, 65.21, 180/65.28, 65.285; 318/139, 580
See application file for complete search history.

(56) References Cited

U.S. PATENT DOCUMENTS

| | | | | |
|---|---|---|---|---|
| 6,307,277 | B1 * | 10/2001 | Tamai et al. ................ | 290/40 C |
| 6,376,927 | B1 * | 4/2002 | Tamai et al. ................ | 290/40 C |
| 6,524,216 | B2 * | 2/2003 | Suzuki et al. ................ | 477/3 |
| 6,945,905 | B2 * | 9/2005 | Tamai et al. ................ | 477/3 |
| 6,962,551 | B1 * | 11/2005 | Genise et al. ................ | 477/109 |
| 8,574,125 | B2 * | 11/2013 | Nedorezov et al. .......... | 477/169 |
| 2002/0103055 | A1 * | 8/2002 | Tani et al. ................ | 477/115 |
| 2003/0004635 | A1 * | 1/2003 | Kamiya et al. ............ | 701/112 |
| 2005/0054480 | A1 * | 3/2005 | Ortmann et al. ............ | 477/6 |
| 2005/0090365 | A1 * | 4/2005 | Tamai et al. ................ | 477/5 |
| 2005/0255968 | A1 * | 11/2005 | Sah et al. ................ | 477/200 |
| 2012/0081051 | A1 * | 4/2012 | Kobayashi et al. ...... | 318/400.23 |
| 2012/0135840 | A1 * | 5/2012 | Tatewaki et al. ............ | 477/115 |
| 2012/0172175 | A1 * | 7/2012 | Nedorezov et al. ......... | 477/169 |
| 2012/0245773 | A1 * | 9/2012 | Suzuki et al. .............. | 701/22 |
| 2012/0265382 | A1 * | 10/2012 | Nefcy et al. .............. | 701/22 |
| 2013/0116866 | A1 * | 5/2013 | Perkins et al. .............. | 701/22 |
| 2013/0211653 | A1 * | 8/2013 | Matsui et al. .............. | 701/22 |
| 2013/0296119 | A1 * | 11/2013 | Reed et al. ................ | 477/5 |
| 2014/0207323 | A1 * | 7/2014 | Yoshida et al. ............. | 701/22 |

* cited by examiner

*Primary Examiner* — Jaime Figueroa (57) ABSTRACT

A method for operating a vehicle including an internal combustion engine and a torque machine rotatably coupled to an input member of a transmission includes operating the vehicle in a coasting mode in response to a driver-requested axle torque and commanding engine operation in an unfueled state. A controller is employed to operate the torque machine to spin the input member to control the engine during a transition across a predetermined engine speed.

19 Claims, 4 Drawing Sheets

METHOD AND APPARATUS FOR CONTROLLING A POWERTRAIN SYSTEM DURING COASTING

TECHNICAL FIELD

This disclosure is related to powertrain system control.

BACKGROUND

The statements in this section merely provide background information related to the present disclosure and may not constitute prior art.

Vehicles employ powertrain systems to generate tractive torque for vehicle propulsion. Powertrain systems may transmit torque originating from multiple torque generative devices, e.g., an engine and one or more non-combustion torque machines, through a transmission device to an output member coupled to a driveline. Control systems for operating such powertrain systems operate the torque-generative devices and apply torque transfer elements in the transmission to transfer torque in response to operator-commanded output torque requests, taking into account fuel economy, emissions, driveability, and other factors. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for operating a vehicle including an internal combustion engine and a torque machine rotatably coupled to an input member of a transmission includes operating the vehicle in a coasting mode in response to a driver-requested axle torque and commanding engine operation in an unfueled state. A controller is employed to operate the torque machine to spin the input member to control the engine during a transition across a predetermined engine speed.

BRIEF DESCRIPTION OF THE DRAWINGS

One or more embodiments will now be described, by way of example, with reference to the accompanying drawings, in which.

DETAILED DESCRIPTION

Figure 1:
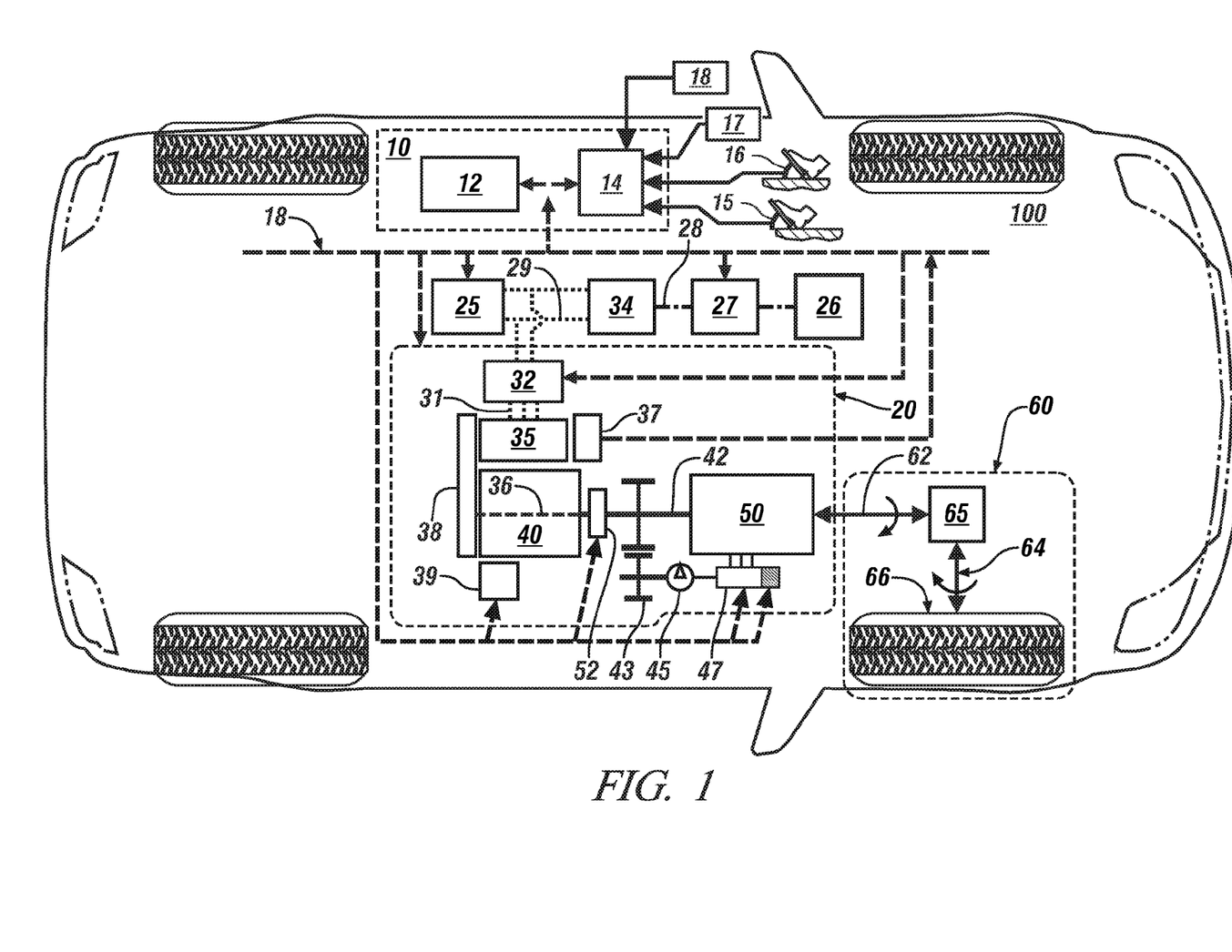
FIG. 1 illustrates a vehicle including a powertrain system having multiple torque-generating devices including an internal combustion engine and an electrically-powered torque machine that mechanically couple to a transmission, in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. The powertrain system 20 includes multiple torque-generating devices including an internal combustion engine 40 and an electrically-powered torque machine 35 that transfer torque through a transmission 50 to a driveline 60. A preferred configuration of the powertrain system 20 includes the torque machine 35 rotatably mechanically coupled to a crankshaft 36 of the engine 40 that rotatably mechanically couples through a torque converter 52 to an input member 42 of the transmission 50. As shown, the crankshaft 36 mechanically rotatably couples to the torque machine 35 via a pulley mechanism 38 and a hydraulic fluid pump 45 directly mechanically couples to the input member 42 via a direct mechanical linkage 43. As such, the hydraulic fluid pump 45 rotates in concert with the electrically-powered torque machine 35, and the electrically-powered torque machine 35 can be employed to rotate the hydraulic fluid pump 45 with or without torque input from the engine 40. Other configurations of the powertrain system 20 that include the torque machine 35 rotatably mechanically coupled to the engine 40 rotatably mechanically coupled to the hydraulic fluid pump 45 and the input member 42 of the transmission 50 may instead be employed.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form a combustion charge to produce torque that is responsive to an operator torque request. The engine 40 is configured to execute autostart and autostop control schemes and fuel cutoff (FCO) control schemes during ongoing operation of the powertrain system 20. The engine 40 is considered to be in an OFF state when it is not rotating. The engine 40 is considered to be in an ON state when it is rotating, including one or more FCO states in which it is spinning and unfueled.

The electrically-powered torque machine 35 is preferably a high-voltage multi-phase electric motor/generator configured to convert stored electric energy to mechanical power and convert mechanical power to electric energy that may be stored in a high-voltage battery 25. The torque machine 35 includes a rotor and a stator and an accompanying position sensor 37, which is a variable reluctance resolver in one embodiment. The electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including torque transfer from the torque machine 35 to the engine 40 for engine autostart and autostop functionality, tractive torque assistance, torque transfer for regenerative vehicle braking, and torque transfer from engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or other positive mechanical connection. The engine 40 may include a low-voltage solenoid-actuated electrical starter 39 for engine starting in response to a key-crank event in one embodiment.

The high-voltage battery 25 electrically connects to an inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. The inverter module 32 is configured to receive motor control commands and control inverter states to provide the motor drive and regeneration functionality. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 39.

The transmission 50 transfers torque between the input member 42 and an output member 62, and may take the form of an automatic transmission, a dual clutch transmission, a clutchless manual transmission or a manual transmission, for example. The transmission 50 is controlled using a controllable hydraulic circuit 47 that signally connects to the control module 12 either directly or via communications bus 18. The hydraulic circuit 47 controls operation of the transmission 50 in one of a plurality of selectable fixed-gear operating modes at a gear ratio that achieves a preferred match between an operator torque request and an engine operating point, and preferably employs one or a plurality of differential gear sets and hydraulically-activated clutches to effect torque transfer in the operating modes over a range of speed ratios between the input member 42 and the output member 62. The transmission 50 executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. The transmission 50 is configured to operate in a neutral state wherein the input member 42 mechanically decouples from an output member 62. Such a transmission configuration can include the torque converter 52 preferably including a controllable torque converter clutch. Alternatively, transmission 50 can be configured with a forward clutch element in addition to or in replacement of the torque converter 52, wherein the forward clutch element mechanically decouples the transmission 50 from the engine 40 when deactivated or in an open state, with the forward clutch element located between the transmission 50 and the direct mechanical linkage 43 coupling the hydraulic fluid pump 45 to the input member 42. The hydraulic fluid pump 45 supplies pressurized hydraulic fluid to one or a plurality of powertrain system elements, including, e.g., the controllable hydraulic circuit 47 to control flow of pressurized hydraulic fluid to elements of the transmission 50 to activate selected clutch elements.

The driveline 60 may include a differential gear device 65 that mechanically couples to an axle 64, transaxle or halfshaft that mechanically couples to a wheel 66. The driveline 60 transfers tractive power between the transmission 50 and a road surface.

The control system 10 includes control module 12 that signally connects to an operator interface 14. The control module 12 preferably includes a plurality of discrete devices that are co-located with the individual elements of the powertrain system 20 to effect operational control of the individual elements of the powertrain system 20. The control module 12 may also include a control device that provides hierarchical control of other control devices. The control module 12 signally and operatively connects to each of the high-voltage battery 25, the inverter module 32, the torque machine 35, the engine 40 and the transmission 50 either directly or via a communications bus 18 to monitor operation and determine parametric states. The operator interface 14 of the vehicle 100 is a controller that signally connects to a plurality of human/machine interface devices through which the vehicle operator commands operation of the vehicle 100. The human/machine interface devices include, e.g., an accelerator pedal 15, a brake pedal 16, a transmission range selector (PRNDL) 17 and a vehicle speed cruise control system 18. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 of either a forward or a reverse direction.

The powertrain system 20 includes a communications scheme including the communications bus 18 to effect communications in the form of sensor signals and actuator command signals between the control system 10 and elements of the powertrain system 20. The communications scheme employs one or more communications systems and devices, including, e.g., the communications bus 18, a direct connection, a local area network bus, a serial peripheral interface bus, and wireless communications to effect information transfer.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Vehicle operation responsive to operator requests includes operating modes of accelerating, braking, coasting, and idling. The acceleration mode includes an operator request to increase vehicle speed. The braking mode includes an operator request to decrease vehicle speed. The coasting mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

The controller executes one or more control routines to control the powertrain system while in a coasting mode in response to an output torque request including a zero torque request input to an accelerator pedal. This includes commanding engine operation in an unfueled state and opening a clutch that is configured to directly couple rotation of the engine and the transmission, e.g., a torque converter clutch. The torque machine spins the input member to control engine rotation, including decelerating the engine to transition across an objectionable driveline resonance, which can include a resonant frequency. This can include operating the torque machine to spin the input member to control the engine to achieve a zero engine speed condition.

Figure 2:
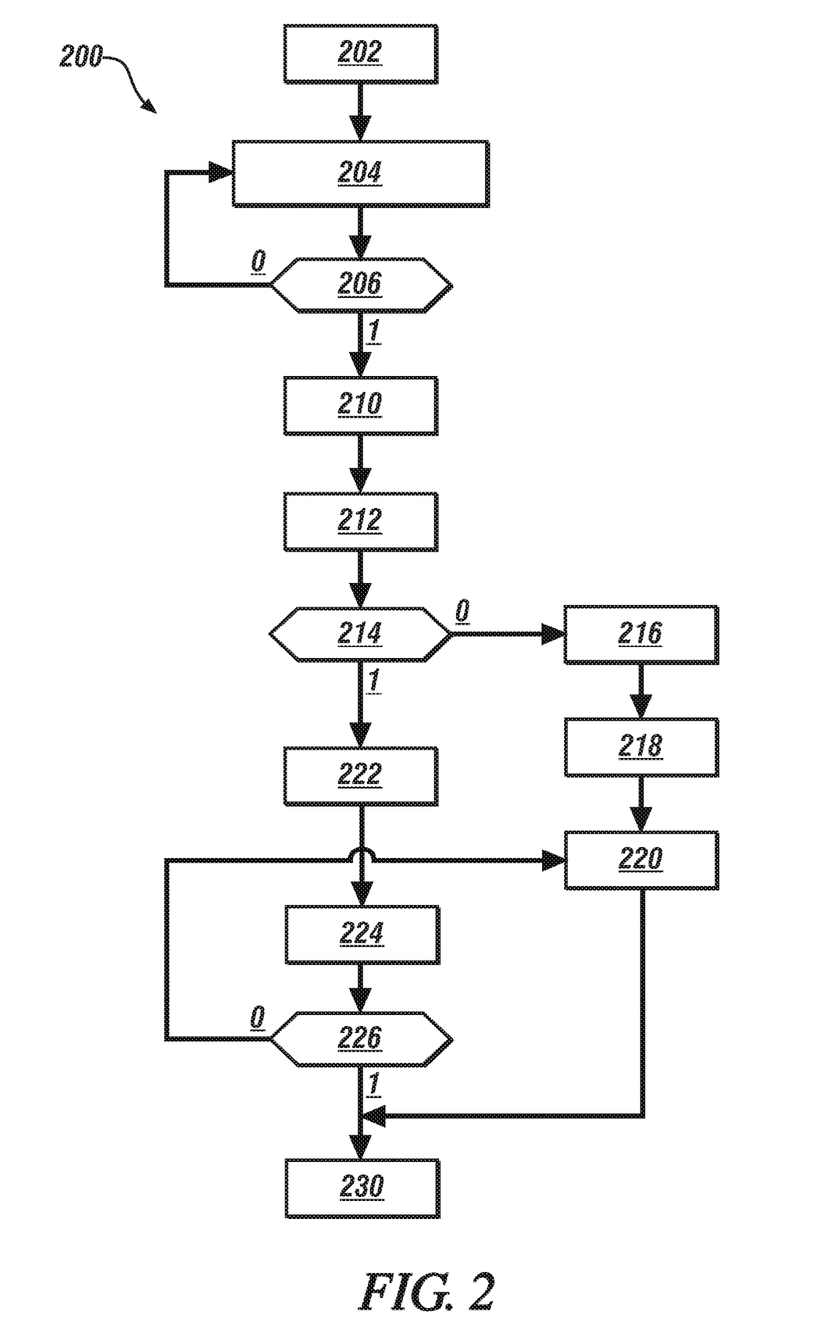
FIG. 2 illustrates a flowchart depicting a coasting mode control routine that is executed to control operation of an internal combustion engine, in accordance with the disclosure.

FIG. 2 is a flowchart depicting a coasting mode control routine (control routine) 200 executed to control operation of a powertrain system, e.g., the powertrain system 20 described with reference to FIG. 1. The control routine 200 controls the electric machine to effect a smooth entry into a coasting mode and effect a smooth exit from the coasting mode, and preferably includes maintaining transmission oil pressure while in the coasting mode, including operating at a calibratable deceleration rate for the coasting mode when applied to an automatic transmission that is in gear and with the torque converter clutch deactivated. Table 1 is provided as a key to FIG. 2 wherein the numerically labeled blocks and the corresponding functions are set forth as follows.

TABLE 1

| BLOCK | BLOCK CONTENTS |
| --- | --- |
| 202 | Monitor Vss, BPP, PPS, RPM, TCC clutch state |
| 204 | Calculate DRAT |

TABLE 1-continued

| BLOCK | BLOCK CONTENTS |
| --- | --- |
| 206 | In coasting mode? BPP = 0% DRAT < A |
| 210 | Operate powertrain system in coasting mode |
| 212 | Calculate X = vehicle acceleration with engine OFF |
| 214 | DRAT < X? |
| 216 | Determine variable coast state operating parameters |
| 218 | Operate powertrain system in variable coast state |
| 220 | Monitor DRAT and adjust commanded vehicle speed |
| 222 | Enter coast prep mode |
| 224 | Operate powertrain system in engine-off coast state |
| 226 | Is BPP > 0? |
| 230 | Exit engine-off coasting mode |

Various vehicle operating parameters are monitored, including vehicle speed (Vss), brake pedal position (BPP), accelerator pedal position (PPS), engine speed (RPM), and torque converter (TCC) clutch state (202), from which a present vehicle operating state is determined (204). This includes determining a driver-requested axle torque (DRAT). The driver-requested axle torque and brake pedal position are evaluated to determine whether to operate the powertrain system in a coasting mode (206). When either the brake pedal position is not zero (BPP>0%) or the driver-requested axle torque is equal to or greater than a calibratable threshold torque (A), (DRAT≥A), the operating conditions are such that the powertrain system cannot operate in the coasting mode (206)(0), and no further action related to operating in the coasting mode is taken this iteration. The calibratable threshold torque (A) is determined based upon operating conditions including vehicle speed, transmission gear range, ambient conditions including temperature and elevation and other factors.

The vehicle operating parameters continue to be monitored (202) to determine whether such operation is feasible at a future point in time. When the brake pedal position is zero (BPP=0%) and the driver-requested axle torque is less than the calibratable threshold torque (DRAT<A) (206)(1), the powertrain system can operate in the coasting mode (210). The coasting mode includes an engine-off coast state and a variable coast state.

Operating the powertrain system in the coasting mode includes determining a preferred vehicle acceleration with the engine in the OFF state (X) (212), which is compared to the driver-requested axle torque (214). The preferred vehicle acceleration with the engine in the OFF state is a calibrated value that is selected for a vehicle design and takes into account vehicle aerodynamics, rolling resistance, operator expectations for deceleration and other factors in relation to the vehicle speed. When the driver-requested axle torque is less than the vehicle acceleration with the engine in the OFF state (DRAT<X) (214)(1), powertrain system operation includes preparing to operate the powertrain system in the engine-off coast state (222). This includes deactivating the torque converter clutch, executing engine fuel cutoff in preparation for transitioning the engine to the OFF state, and operating the torque machine to decelerate the engine to transition engine speed to 0 RPM achieve the engine OFF state (224). This operation includes operating the torque machine to decelerate the engine through engine speed(s) associated with an undesired frequency that can be found between engine operating in a normal mode and an engine OFF speed of 0 RPM. By way of example, an undesired frequency can include an engine speed associated with resonant or natural frequency(ies) of powertrain, driveline or other vehicle components and systems, such as the vehicle body structure, that lead to objectionable resonance, such as driveline-induced low frequency noise often referred to as boom or moan noise, driveline imbalances, vehicle shuffle, powertrain launch shudder, and axle whine. Objectionable resonance includes audible sound, physical vibration and other manifestations that are discernible by a vehicle operator and/or passengers during vehicle operation. Engine operation can excite such objectionable resonance(s) by achieving driveline speed(s) that corresponds to the resonant frequency(ies). Operating the torque machine to control the engine speed and deceleration rate through the driveline resonant speed(s) includes a preferred engine deceleration that is specifically selected for a vehicle design and engine/powertrain configuration based upon its resonant frequency(ies).

When the driver-requested axle torque is not less than the vehicle acceleration with the engine in the OFF state (X) (DRAT<X) (214)(0), the powertrain system operates the variable coast state (216), which includes continuing engine operation in the engine fuel cutoff state and determining a target engine speed that is associated with powertrain system operation that achieves the driver-requested axle torque with the torque machine operating in a speed control mode that maintains engine operation at a target speed and a target deceleration rate. The target engine speed is determined based upon vehicle speed, transmission gear state, transmission oil temperature, and operating characteristics of the torque converter.

During this period, the vehicle operates in the variable coast state (218) with the torque converter clutch open and the engine spinning in the fuel cutoff state. The driver-requested axle torque is monitored to determine that the driver-requested axle torque is within a range between the vehicle acceleration with the engine in the OFF state (X) and the calibratable threshold torque (A). Under such conditions, the torque machine speed and corresponding engine speed are adjusted responsive to the driver-requested axle torque and the target engine speed (220). In this manner, the vehicle deceleration rate can be controllably adjusted using the torque machine to adjust magnitude of engine drag, via speed control, through the torque converter in order to meet coast down requirements associated with a vehicle technical specification. By way of example, a vehicle drag and associated deceleration rate can be in the range of 0.05 g to 0.10 g during coasting to effect vehicle deceleration. Such operation permits the torque machine to facilitate a smooth entry into a coasting mode and a smooth exit out of a coasting mode, and maintains or otherwise controls transmission oil pressure while in the coasting mode in the automatic transmission. Furthermore, the engine speed is inversely proportional to engine drag, and thus the rate of vehicle deceleration can be controlled by controlling the speed of the torque machine to control the engine speed. The deceleration rate for operation in the coasting mode is calibratable when the torque converter clutch is activated with the automatic transmission in gear.

The brake pedal position (BPP) is monitored (226) during operation in both the engine-off coast state (224) and the variable coast state (218). So long as the brake pedal position is zero (BPP=0%), such operation continues (226)(0). Such operation can also change in response to the driver-requested axle torque. When the brake pedal position becomes non-zero (BPP>0%), such operation stops (226)(1). The control routine discontinues operation in the coasting mode, and undertakes regenerative braking operation. In the powertrain of FIG. 1, such operation can include employing the torque machine to ramp up engine speed to a target speed to lock the torque converter clutch for regenerative braking. Ramping up the engine speed is accomplished to operate the hydraulic pump to achieve hydraulic pressure in the torque converter sufficient to effect locking the torque converter clutch. This can further include engine autostarting. (230).

Figure 3:
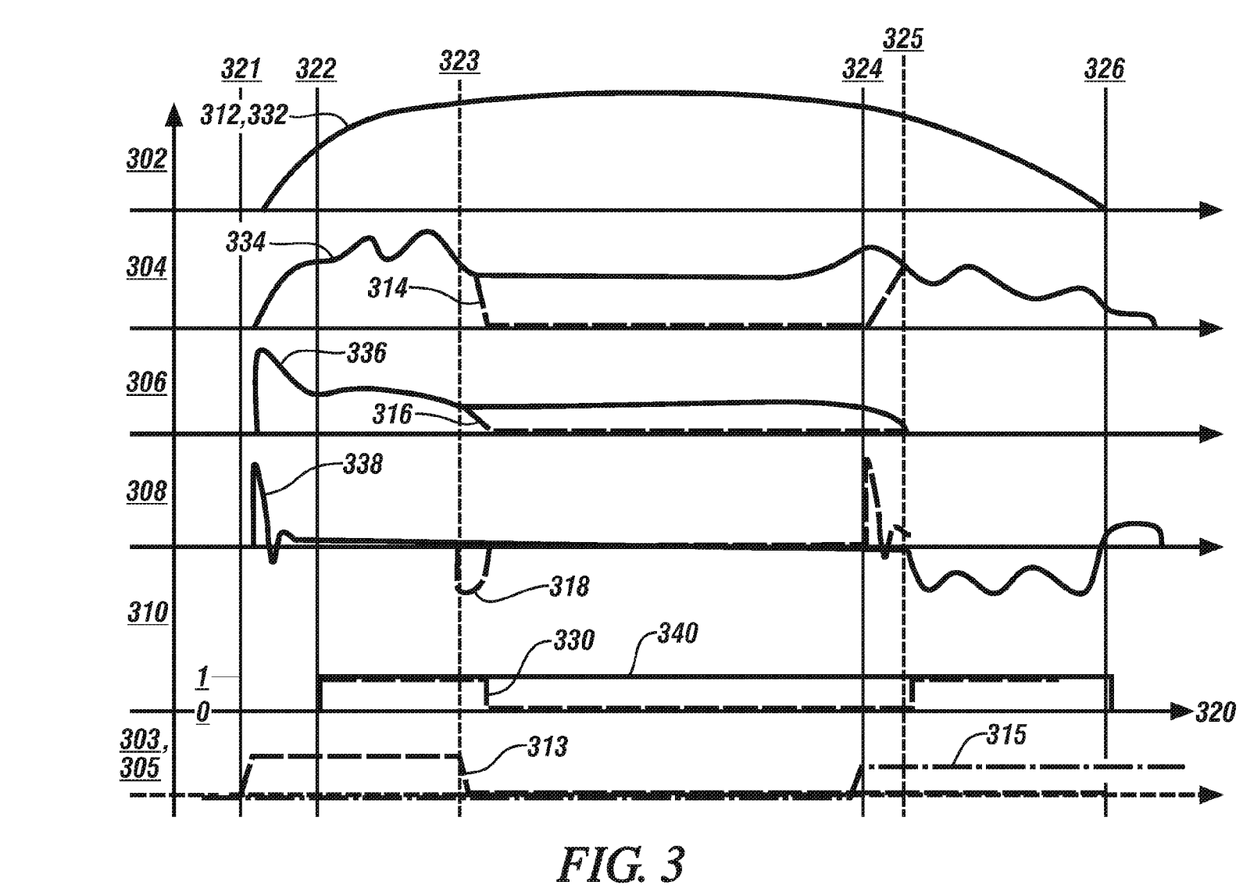
FIG. 3 illustrates a plurality of time-coincident parameters that depict operation of a powertrain system executing the coasting mode control routine wherein the engine speed transitions to 0 RPM during operation in the coasting mode, in accordance with the disclosure.

FIG. 3 graphically shows a plurality of time-coincident parameters that depict operation of a vehicle employing an embodiment of the powertrain system 20 operating an embodiment of the control routine 200 of FIG. 2 during one vehicle operating cycle that includes an engine start/run event, vehicle acceleration, steady-state, deceleration, and vehicle stopping. In this depiction, the powertrain system is operating in an engine-off coast state, wherein the engine speed transitions to 0 RPM during operation in the coasting mode.

The plotted parameters include vehicle speed (Km/H) 302, engine speed (RPM) 304, engine fuel flow 306 (Nm) (indicating engine torque), torque machine torque (Nm) 308, torque converter clutch status (Locked=1, Unlocked or Open=0) 310, an accelerator pedal position (%) 303 and a brake pedal position (%) 305, all in relation to time 320 which is shown on the horizontal axis. Plotted data reflects vehicle operation during execution of the control routine 200 including vehicle speed 312, engine speed 314, engine fuel flow 316 (indicating engine torque), torque machine torque 318 and torque converter clutch status 330, which are responsive to signals from the human/machine interface devices including an operator acceleration request 313 and an operator braking request 315. By way of contrast, the plotted data also reflects vehicle operation that does not employ the control routine 200, including vehicle speed 332, engine speed 334, engine fuel flow 336 (indicating engine torque), torque machine torque 338 and torque converter clutch status 340, which are responsive to the signals from the human/machine interface devices including the operator acceleration request 313 and the operator braking request 315.

Vehicle operation includes engine start/run and vehicle acceleration beginning at time 321 in response to operator commands including an increase in the operator acceleration request 313. At time 322, operating conditions are conducive to locking the torque converter clutch, indicated by a change in the torque converter clutch status 330 from 0 to 1. Prior to time 323, powertrain system operation is unaffected by whether the control routine 200 is executing. At time 323, the operator acceleration request 313 changes to 0%, thus allowing the vehicle to coast. The torque converter clutch status 330 changes from 1 to 0, thus deactivating the torque converter clutch. In response to specific operating conditions, the control routine 200 responds by reducing the engine fuel flow 316 to zero and the engine speed 314 to zero, with the torque machine torque 318 controlled to effect the transition. Just prior to time 324, the operator braking request 315 increases, indicating an operator input to the brake pedal. In response, the torque machine torque 318 increases to spin the engine, indicated by an increase in the engine speed 314. There is no associated increase in the engine fuel flow 316 because the torque machine is providing the torque to spin the engine. Prior to time 325, the engine has transitioned through speed(s) associated with the driveline resonant frequency(ies) with attendant damping through the torque converter. At time 325, the torque converter clutch locks, indicated by the torque converter clutch status changing from 0 to 1, permitting operation in regenerative braking mode. The torque machine torque 318 changes from a torque generating state, i.e., a net positive value, to an electric power generating state, i.e., a net negative value. At or near time 326, forward movement of the vehicle stops, the torque converter clutch deactivates, and the engine speed reduces to 0 RPM with attendant action by the torque machine.

In contrast, during powertrain system operation employing the control routine that does not employ the control routine 200, the torque converter clutch status 340 remains activated (i.e., equal to 1) after the operator acceleration request 313 reduces to 0%. The engine speed 334 achieves and remains at an engine speed proportional to the vehicle speed with the torque converter locked with attendant engine fuel flow 336 to maintain the engine operation. The engine fuel flow 336 reduces to 0 gm/s only in response to vehicle braking at time 324.

Figure 4:
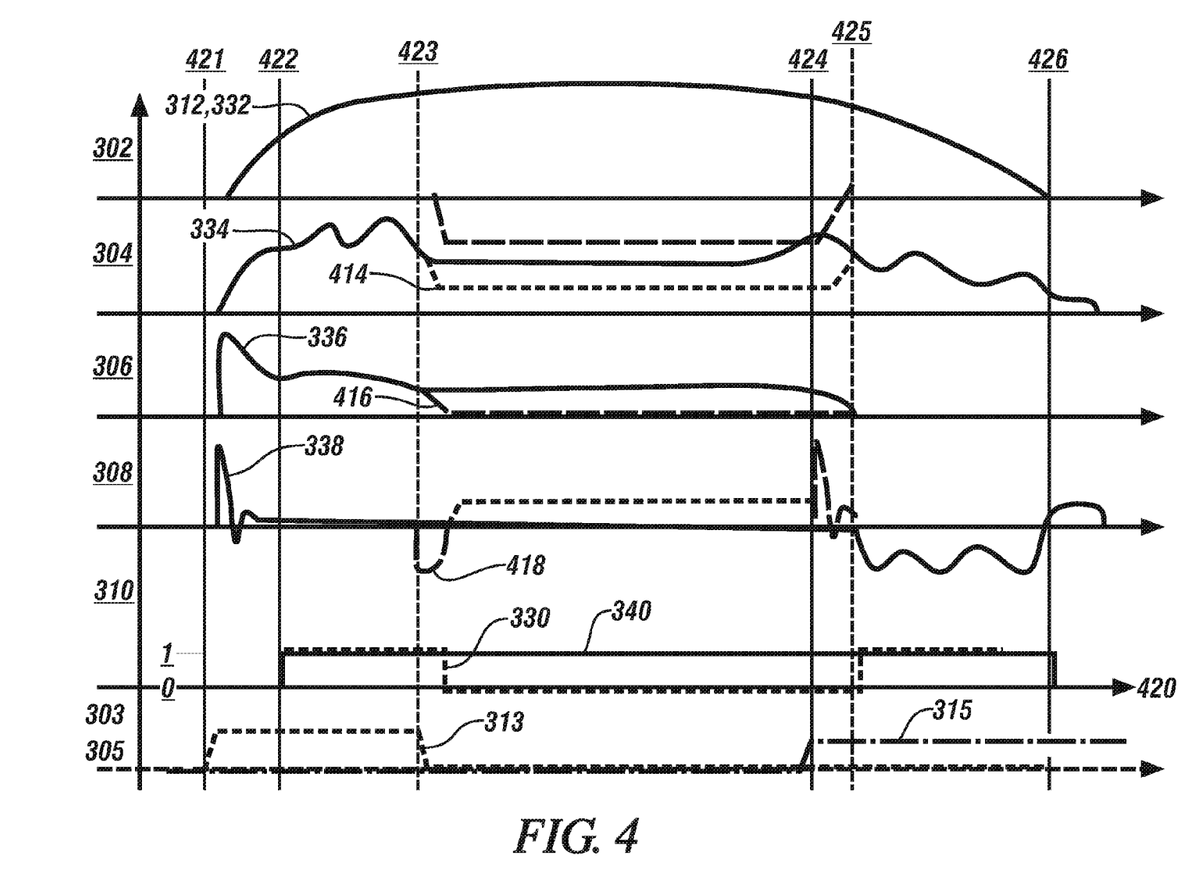
FIG. 4 illustrates a plurality of time-coincident parameters that depict operation of a powertrain system executing the coasting mode control routine wherein the engine speed transitions to a non-zero engine speed during operation in the coasting mode, in accordance with the disclosure.

FIG. 4 graphically shows a plurality of time-coincident parameters that depict operation of a vehicle employing an embodiment of the powertrain system 20 operating an embodiment of the control routine 200 described with reference to FIG. 2 during one vehicle operating cycle that includes an engine start/run event, vehicle acceleration, steady-state, deceleration, and vehicle stopping. In this depiction, the vehicle is operating in a variable coast state, wherein the engine speed transitions to a non-zero engine speed during operation in the coasting mode to maintain hydraulic fluid pressure in the torque converter.

The plotted parameters include vehicle speed (Km/H) 302, engine speed (RPM) 304, engine fuel flow 306 (Nm) (indicating engine torque), torque machine torque (Nm) 308, torque converter clutch status (Locked=1, Unlocked=0) 310, an accelerator pedal position (%) 303 and a brake pedal position (%) 305, all in relation to time 420, which is shown on the horizontal axis.

The plotted data reflects vehicle operation during execution of the control routine 200 including vehicle speed 312, engine speed 414, engine fuel flow 416 (indicating engine torque), torque machine torque 418 and torque converter clutch status 330, which are responsive to signals from the human/machine interface devices including an operator acceleration request 313 and an operator braking request 315. By way of contrast, the plotted data also reflects powertrain system operation that does not employ the control routine 200, including vehicle speed 332, engine speed 334, engine fuel flow 336 (indicating engine torque), torque machine torque 338 and torque converter clutch status 340, which are responsive to the signals from the human/machine interface devices including the operator acceleration request 313 and the operator braking request 315. The vehicle operation is analogous to that shown with reference to FIG. 3.

Vehicle operation includes engine start/run and vehicle acceleration beginning at time 421 in response to operator commands including an increase in the operator acceleration request 313. At time 422, operating conditions are conducive to locking the torque converter clutch, indicated by a change in the torque converter clutch status 330 from 0 to 1. Prior to time 423, vehicle operation is unaffected by whether the control routine 200 is executing. At time 423, the operator acceleration request 313 changes to 0%, thus allowing the vehicle to coast. The control routine 200 responds by reducing the engine fuel flow 416 to zero while controlling the torque machine speed 418 to maintain the engine speed 414 to operate the hydraulic pump that is sufficient maintain hydraulic pressure above a minimum threshold pressure. The torque converter clutch status 330 can change from 1 to 0 indicating deactivation of the torque converter clutch. When the operator braking request 315 increases at time 424, operation continues as previously described with reference to FIG. 3. This includes as follows. At time 425, the torque converter clutch locks, indicated by the torque converter clutch status changing from 0 to 1, permitting operation in regenerative braking mode. The torque machine torque 418 changes from a torque generating state, i.e., a net positive value, to an electric power generating state, i.e., a net negative value. At or near time 426, forward movement of the vehicle stops, the torque converter clutch deactivates, and the engine speed reduces to 0 RPM with attendant action by the torque machine.

The control routine 200 provides a vehicle coasting function that employs supplemental torque from a torque machine to smooth driveline vibration during engine autostart and autostop transitions. The coasting mode control routine 200 can also provide a minimum transmission oil pressure to facilitate variable vehicle coasting deceleration rates that are calibratable and thus selectable.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a vehicle including an internal combustion engine and a torque machine rotatably coupled to an input member of a transmission, the method comprising:
   operating the vehicle in a coasting mode in response to a driver-requested axle torque being less than a threshold torque and a brake pedal position being zero, including determining a preferred vehicle acceleration with the internal combustion engine in an off state;
   comparing the preferred vehicle acceleration with the driver-requested axle torque;
   commanding engine operation in an unfueled state; and
   employing a controller to operate the torque machine to spin the input member to control the engine during a transition across a predetermined engine speed.

2. The method of claim 1, wherein the controller is employed to operate the torque machine to spin the input member to control the engine during the transition across the predetermined engine speed when the driver-requested axle torque is less than the preferred vehicle acceleration with the internal combustion engine in the off state.

3. The method of claim 1, further comprising employing the controller to operate the torque machine to adjust engine drag to control vehicle deceleration in response to the driver-requested axle torque when the driver-requested axle torque is greater than the preferred vehicle acceleration with the internal combustion engine in the off state.

4. The method of claim 3, wherein the torque machine is operated in a speed control mode.

5. The method of claim 1, wherein employing the controller to operate the torque machine to spin the input member to control the engine during the transition across the predetermined engine speed comprises decelerating the engine during the transition across the predetermined engine speed to achieve a zero engine speed condition when the driver-requested axle torque is less than the preferred vehicle acceleration with the internal combustion engine in the off state.

6. The method of claim 1, wherein employing the controller to operate the torque machine to spin the input member to control the engine during the transition across the predetermined engine speed comprises decelerating the engine during the transition across the predetermined engine speed to achieve an engine speed that is less than the predetermined engine speed when the driver-requested axle torque is greater than the preferred vehicle acceleration with the internal combustion engine in the off state.

7. The method of claim 6, wherein the vehicle further comprises a hydraulic fluid pump rotatably coupled to the input member and fluidly connected to a hydraulic circuit of the transmission; and wherein said engine speed that is less than the predetermined engine speed comprises an engine speed corresponding to a rotational speed for the hydraulic fluid pump sufficient for achieving a preferred hydraulic pressure in the hydraulic circuit.

8. The method of claim 1, further comprising opening a clutch configured to transfer torque between the engine and the transmission prior to said transition across the predetermined engine speed.

9. The method of claim 8, wherein opening the clutch comprises opening a clutch of a torque converter configured to transfer torque between the engine and the transmission.

10. The method of claim 1, further comprising discontinuing operating the vehicle in the coasting mode in response to an operator braking request and operating the torque machine to spin the input member to accelerate the engine to transition across the predetermined engine speed, activating a clutch configured to transfer torque between the engine and the transmission, and then operating the torque machine in response to the operator braking request.

11. A method for operating a powertrain system including an internal combustion engine and a torque machine rotatably coupled to an input member of a transmission, the method comprising:

operating the powertrain system in a coasting mode including commanding engine operation in an unfueled state in response to a driver-requested axle torque being less than a threshold torque and a brake pedal position being zero, including determining a preferred vehicle acceleration with the internal combustion engine in an off state;

comparing the preferred vehicle acceleration with the driver-requested axle torque; and operating the torque machine to spin the input member to control the engine during a transition across a predetermined engine speed associated with an objectionable resonance.

12. The method of claim 11, wherein the torque machine is operated to spin the input member to control the engine during the transition across the predetermined engine speed associated with the objectionable resonance when the driver-requested axle torque is less than the preferred vehicle acceleration.

13. The method of claim 12, wherein the torque machine is operated in a speed control mode to adjust engine drag to control a vehicle deceleration when the driver-requested axle torque is greater than the preferred vehicle acceleration.

14. The method of claim 11, wherein operating the torque machine to spin the input member to control the engine during the transition across the predetermined engine speed associated with the objectionable resonance comprises decelerating the engine during said transition to achieve a zero engine speed condition.

15. The method of claim 11, wherein operating the torque machine to spin the input member to control the engine during the transition across the predetermined engine speed associated with the objectionable resonance comprises decelerating the engine during said transition to achieve an engine speed that is less than the predetermined engine speed associated with the objectionable resonance.

16. The method of claim 11, wherein the powertrain system further comprises a hydraulic fluid pump rotatably coupled to the input member and fluidly connected to a hydraulic circuit of the transmission; and wherein said engine speed that is less than the predetermined engine speed associated with the objectionable driveline resonance comprises an engine speed corresponding to a rotational speed for the hydraulic fluid pump sufficient for achieving a preferred hydraulic pressure in the hydraulic circuit.

17. The method of claim 11, further comprising opening a clutch configured to transfer torque between the engine and the transmission prior to said transition across the predetermined engine speed associated with the objectionable resonance.

18. The method of claim 11, further comprising discontinuing operating the powertrain system in the coasting mode in response to an operator braking request and operating the torque machine to spin the input member to control the engine to transition across the predetermined engine speed associated with the objectionable resonance, activating a torque transfer device configured to transfer torque between the engine and the transmission, and then operating the torque machine in response to the operator braking request.

19. A method for operating a powertrain system including an internal combustion engine and a torque machine rotatably coupled via a torque converter to an input member of a transmission, the method comprising:

in response to a driver-requested axle torque being less than a threshold torque and a brake pedal position being zero, operating the powertrain system in a coasting mode comprising:

determining a preferred vehicle acceleration with the internal combustion engine in an off state comparing the preferred vehicle acceleration with the driver-requested axle torque;

commanding engine operation in an unfueled state;

operating the torque machine to spin the input member to control the engine during a transition across a predetermined engine speed associated with objectionable resonance when the driver-requested axle torque is less than the preferred vehicle acceleration; and operating the torque machine to control the engine speed to adjust engine drag to control vehicle deceleration in response to the driver-requested axle torque when the driver-requested axle torque is greater than the preferred vehicle acceleration.

* * * * *